US012420968B2

(12) United States Patent
Borelli et al.

(10) Patent No.: US 12,420,968 B2
(45) Date of Patent: Sep. 23, 2025

(54) PERFORMING WEB TENSIONING ADJUSTMENTS IN A FOOD PACKAGING SYSTEM BASED ON REINFORCEMENT LEARNING

(71) Applicant: Tetra Laval Holdings & Finance S.A., Pully (CH)

(72) Inventors: Gabriele Borelli, Spilamberto (IT); Stefano Fornasari, Modena (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 152 days.

(21) Appl. No.: 18/257,854

(22) PCT Filed: Dec. 17, 2021

(86) PCT No.: PCT/EP2021/086365
§ 371 (c)(1),
(2) Date: Jun. 15, 2023

(87) PCT Pub. No.: WO2022/129449
PCT Pub. Date: Jun. 23, 2022

(65) Prior Publication Data
US 2024/0059442 A1    Feb. 22, 2024

Related U.S. Application Data

(60) Provisional application No. 63/126,858, filed on Dec. 17, 2020.

(51) Int. Cl.
*B65B 59/00* (2006.01)
*B65B 3/00* (2006.01)
(Continued)

(52) U.S. Cl.
CPC ............... *B65B 41/16* (2013.01); *B65B 3/00* (2013.01); *B65B 3/26* (2013.01); *B65B 9/20* (2013.01);
(Continued)

(58) Field of Classification Search
CPC ....... B65B 41/16; B65B 9/207; B65B 51/227; B65B 51/26; B65B 55/04; B29C 65/3656; B29C 65/3668; B29C 65/368
(Continued)

(56) References Cited

U.S. PATENT DOCUMENTS 5,148,841 A   9/1992  Graffin et al.
6,397,557 B1  6/2002  Bassissi et al.
(Continued)

FOREIGN PATENT DOCUMENTS

CN    106144722 A    11/2016
EP       0614809 A2 *  9/1994   ............. B65B 41/16
(Continued)

OTHER PUBLICATIONS

International Search Report and Written Opinion in PCT/EP2021/086365 mailed on May 25, 2022 in 13 pages.

*Primary Examiner* — Jacob A Smith
(74) *Attorney, Agent, or Firm* — Knobbe Martens Olson & Bear LLP

(57) ABSTRACT

Methods and apparatus, including computer program products, are described for controlling web tensioning in a food packaging machine comprising a plurality of sub-systems. One or more local variable value are received, which indicate measurements by the food packaging machine of one or more physical parameters for a web tensioning sub-system. One or more remote variable values are received, which indicate measurements by the food packaging machine of one or more physical parameters for one or remote sub-
(Continued)

systems. One or more control parameter values are determined for the web tensioning sub-system, by processing the remote and the local variable values using a reinforcement learning model and a local control model. One or more control parameters of the web tensioning sub-system are adjusted in accordance with the determined control parameter values.

11 Claims, 2 Drawing Sheets

(51) Int. Cl.
    *B65B 3/26*      (2006.01)
    *B65B 9/20*      (2012.01)
    *B65B 9/213*      (2012.01)
    *B65B 37/00*      (2006.01)
    *B65B 41/16*      (2006.01)
    *B65B 43/08*      (2006.01)
    *B65B 43/42*      (2006.01)
    *B65B 51/14*      (2006.01)
    *B65B 57/00*      (2006.01)
    *B65B 57/02*      (2006.01)
    *B65B 57/04*      (2006.01)
    *B65B 57/14*      (2006.01)
    *B65H 23/04*      (2006.01)
    *B65H 23/188*      (2006.01)
    *G05B 13/02*      (2006.01)

(52) U.S. Cl.
    CPC .............. *B65B 9/213* (2013.01); *B65B 37/00* (2013.01); *B65B 43/08* (2013.01); *B65B 43/42* (2013.01); *B65B 51/146* (2013.01); *B65B 57/00* (2013.01); *B65B 57/02* (2013.01); *B65B 57/04* (2013.01); *B65B 57/145* (2013.01); *B65B 59/003* (2019.05); *B65H 23/048* (2013.01); *B65H 23/1888* (2013.01); *G05B 13/024* (2013.01); *G05B 13/027* (2013.01); *B65B 2210/04* (2013.01); *B65H 2511/112* (2013.01); *B65H 2557/24* (2013.01); *B65H 2557/264* (2013.01); *B65H 2801/69* (2013.01)

(58) Field of Classification Search
    USPC .......................................................... 53/450
    See application file for complete search history.

(56) References Cited

U.S. PATENT DOCUMENTS

| | | | |
|---|---|---|---|
| 6,732,496 | B1 | 5/2004 | Wessman et al. |
| 7,827,768 | B2 | 11/2010 | Rosberg et al. |
| 10,343,803 | B2 | 7/2019 | Scarabelli et al. |
| 10,399,724 | B2 | 9/2019 | Aiello et al. |
| 2009/0178728 | A1 | 7/2009 | Cochran et al. |
| 2020/0250109 | A1 | 8/2020 | Yaavoc et al. |
| 2020/0299120 | A1 | 9/2020 | Bhaskar et al. |

FOREIGN PATENT DOCUMENTS

| | | | | |
|---|---|---|---|---|
| EP | 0950608 A1 | * | 10/1999 | ............. B65B 57/00 |
| EP | 3 725 689 A1 | | 10/2020 | |
| EP | 3 741 690 A1 | | 11/2020 | |
| JP | 2007-069940 A | | 3/2007 | |
| JP | 2020-114653 A | | 7/2020 | |
| JP | 2020147405 A | | 9/2020 | |
| WO | WO2019188931 A1 | * | 3/2021 | ............. B65H 18/26 |

* cited by examiner

PERFORMING WEB TENSIONING ADJUSTMENTS IN A FOOD PACKAGING SYSTEM BASED ON REINFORCEMENT LEARNING

TECHNICAL FIELD

The invention relates to food packaging systems, and more specifically to adjusting the web tensioning in food packaging systems.

BACKGROUND

Automation control systems are used in a wide range of manufacturing and processing settings today and have continuously grown in complexity. A common approach for managing this complexity is to divide the system into sub-systems and develop suitable control mechanisms for each sub-system. However, this approach does not always result in an optimal solution for the system as a whole.

Capturing influencing factors from different sources becomes increasingly difficult as a system gets more complex and the number of influencing factors grows. This complexity further increases when the relationships between influencing factors, control variables and the system itself are non-linear and/or difficult to model.

With regards to the level of abstraction in industrial control, two main perspectives can be taken: low level control and high level control, respectively. Low level control implies the management of individual automation components (e.g., actuators, servo motors, heaters and many other devices). High level control can grow in abstraction going from a sub-system level, to a system level, and further to the orchestration of an entire plant with multiple systems and sub-systems that need to operate in concert.

As an example, food processing and packaging equipment typically includes several sub-systems, such as a filling system, a sterilizing system, a package folding system, etc. Each sub-system contains a number of different elements (e.g., pneumatic actuators, servo motors, DC motors, AC motors, sensors, other actuators, etc.). These individual elements are typically controlled by a low level, local control system that exploits conventional control techniques, such as Proportional Integral Derivative (PID) controllers, to control a target variable. A feedback loop is used to keep the error of the controller low with respect to a target working point of the element, system, or sub-system.

However, PID controllers need to be tuned for their specific application and are usually optimized for a specific working range and working dynamics. They are also not very well suited to adapt to unforeseen circumstances or working conditions that are outside of their conventional working zone. When such conditions change (e.g., different working environment, changes in the automation element, changes in the manufacturing process, etc.) the parameters of the PID controller often need to be tuned and re-calibrated. This can be a time-consuming and complex process that requires significant manual input from experienced personnel, especially when a large number of elements and/or sub-systems are involved, such as is typically the case in food processing and packaging equipment.

A filling machine is an example of a complex system that packages liquid, semi-liquid or pourable food products, such as fruit juice, UHT (ultra-high temperature treated) milk, wine, tomato sauce, etc., into composite packages made of a multilayer composite packaging material for distribution and sale. A typical example is the parallelepiped-shaped package for pourable food products known as Tetra Brik Aseptic™, which is made by sealing and folding a laminated strip packaging material. The packaging material has a multilayer structure comprising a carton and/or paper base layer, covered on both sides with layers of heat-seal plastic material, e.g. polyethylene. In the case of aseptic packages for long-storage products, the packaging material also includes a layer of oxygen-barrier material, e.g. an aluminum foil, which is superimposed on a layer of heat-seal plastic material, and is in turn covered with another layer of heat-seal plastic material forming the inner face of the package eventually contacting the food product.

The filling machine starts from a web of multilayer composite packaging material (wound from a reel). The web is fed through the filling machine, wherein a tube is formed from the web by producing a longitudinal sealing. The liquid food product is fed into the tube via a pipe; a lower end of the tube is then fed into a folding device, in which a transversal sealing is produced, the tube being folded according to folding lines, also referred to as weakening lines, and then cut off such that the composite packages filled of the liquid food product are formed.

The machine module or sub-system in charge of package forming, transversal sealing and cutting is referred to as a "jaw system", and is composed of a couple of jaw pairs whose synchronized movements allow pulling down the packaging material tube and fully closing a filled package. The jaw system is an important part of the filling machine, since the coordinated motion of the two jaw pairs is responsible not only for the correct shaping of packages, but also for pulling the web through the machine.

When the jaw system pulls on the packaging material, it does not do so in a continuous fashion, but rather in a "pulsating" fashion as the individual packages are created. This intermittent pulling of the web occurs at the end of the packaging machine. The packaging material, on the other hand, is located on big rolls at the beginning of the packaging machine. Therefore, the intermittent pulling on the packaging material by the jaw system creates a varying force on the packaging material due, in part, to the inertia of the roll of packaging material, and in part on the packaging material in itself. This could be a problem as certain parts of the packaging machine require the web to move at a constant speed. In addition, having too much tension in the web could result in package integrity issues. Furthermore, the web tension can be affected by other factors, such as the length of the web through the packaging machine from beginning to end, or the mass of the product that is being filled into the packaging material tube, as it will pull down on the web. A web tensioning system aims to keep the packaging material web in a tensioned status that is compatible with the packaging process in the filling machine. A slacking web would result in poor performance, and an extremely tight web would introduce defects and damages in the packages. Currently, machine technicians typically need to rely on manual configuration involving a trial-and-error approach to obtain proper web tension in the web tensioning system. Furthermore, there is currently no way to take into account the influence factors such as a jaw system motion profile, filling status (e.g. filling flow and product level), packaging material characteristics (e.g. thickness, mechanical properties), etc., have on the web tensioning.

Thus, there is a need for improved techniques for controlling the web tensioning, which also take into account a range of events that occur in the packaging machine, and which may affect the web tensioning, such that proper web tension is always maintained.

SUMMARY

It is an object of the invention to at least partly overcome one or more limitations of the prior art. In particular, it is an object to provide methods and systems that make it possible to control the web tensioning of a food packaging machine by taking into account measured parameter values not only for a local web tensioning sub-system, but also for other, remote, sub-systems in the food packaging machine. As a result, proper web tension can be accomplished, which enables both a quicker setup process when the food packaging machine is first configured, and a more reliable manufacturing process with fewer packages needing to be discarded.

In one aspect of the invention, this is achieved by a method for controlling the web tensioning in a food packaging machine, wherein the food packaging machine comprises a plurality of sub-systems. The method includes:
  receiving one or more local variable values indicating measurements by the food packaging machine of one or more physical parameters for a web tensioning sub-system;
  receiving one or more remote variable values indicating measurements by the food packaging machine of one or more physical parameters for one or remote sub-systems;
  determining one or more control parameter values for the web tensioning sub-system, by processing the remote variable values and the local variable values using a reinforcement learning model and a local control model; and
  adjusting one or more control parameters of the web tensioning sub-system in accordance with the determined control parameter values.

The exploitation of both local variables and inputs from remote sub-systems will results in more precisely controlled web tensioning and a more resilient operation when unexpected events occur in the food packaging machine. This results in fewer wasted packages (and food product), and thus more efficient and environmentally friendly operation of the food packaging machine. Given the ability to better control the package forming process, shorter time to market for new products and/or configurations is also made possible as less manual testing is needed. This is further enhanced as control policies can be learned in simulated environment, such that the food packaging machine does not need to be manually configured "from scratch".

In one embodiment, the reinforcement learning model is a deep reinforcement learning model including a neural network. Deep reinforcement learning is particularly useful when evolving control policies for sub-systems that must consider a large number of variables whose internal relations and effects on the sub-system may not be known, and presents a more sophisticated approach to determining the one or more control parameter values for the local web tensioning sub-system of the food packaging machine than what might be possible using conventional reinforcement learning without a neural network.

In one embodiment, the web tensioning sub-system includes two stationary guide rolls and a movable guide roll. By including a movable guide roll, the distance between the movable guide roll and each stationary guide roll can be varied, thus being able to excerpt a force on the web as the guide roll moves (typically by using a servo motor), thus creating a simple way of adjusting the web tension, while leaving other parameters (e.g., speed) etc. of the web unchanged.

In one embodiment, the movable guide roll is located between the two stationary guide rolls along a path traversed by the web through the packaging machine, and is movable so as to increase or decrease the tension of the web in response to instructions received control parameter values. This achieves similar advantages to those just described, and also evenly distributes any changes in web tensioning evenly across the two stationary guide rolls.

In one embodiment, the neural network is a convolution neural network, a recurrent neural network, a Long Short-Term Memory neural network, or a fully connected neural network. These are all different types of neural networks that are well known to those having ordinary skill in the art and are thus more easily incorporated into existing food packaging machine settings.

In one embodiment, the one or more local variable values include measurements relating to a web tensioning set point or a current web tensioning system position, and the one or more remote variable values include measurements relating to web movement control variables, a jaw system motion profile, packaging material characteristics, or a filling status. Having improved control over these parameters, as is accomplished by the data-driven approach of the various embodiments described herein, significantly enhances the operation of the web tensioning sub-system, and thus the overall operation of the packaging machine.

Other aspects of the invention include a system and a computer program for controlling the web tensioning in a food packaging machine. The features and advantages of these aspects of the invention are substantively the same as those discussed above for the method.

Still other objectives, features, aspects and advantages of the invention will appear from the following detailed description as well as from the drawings.

DRAWINGS

Embodiments of the invention will now be described, by way of example, with reference to the accompanying schematic drawings.

DETAILED DESCRIPTION

Figure 1:
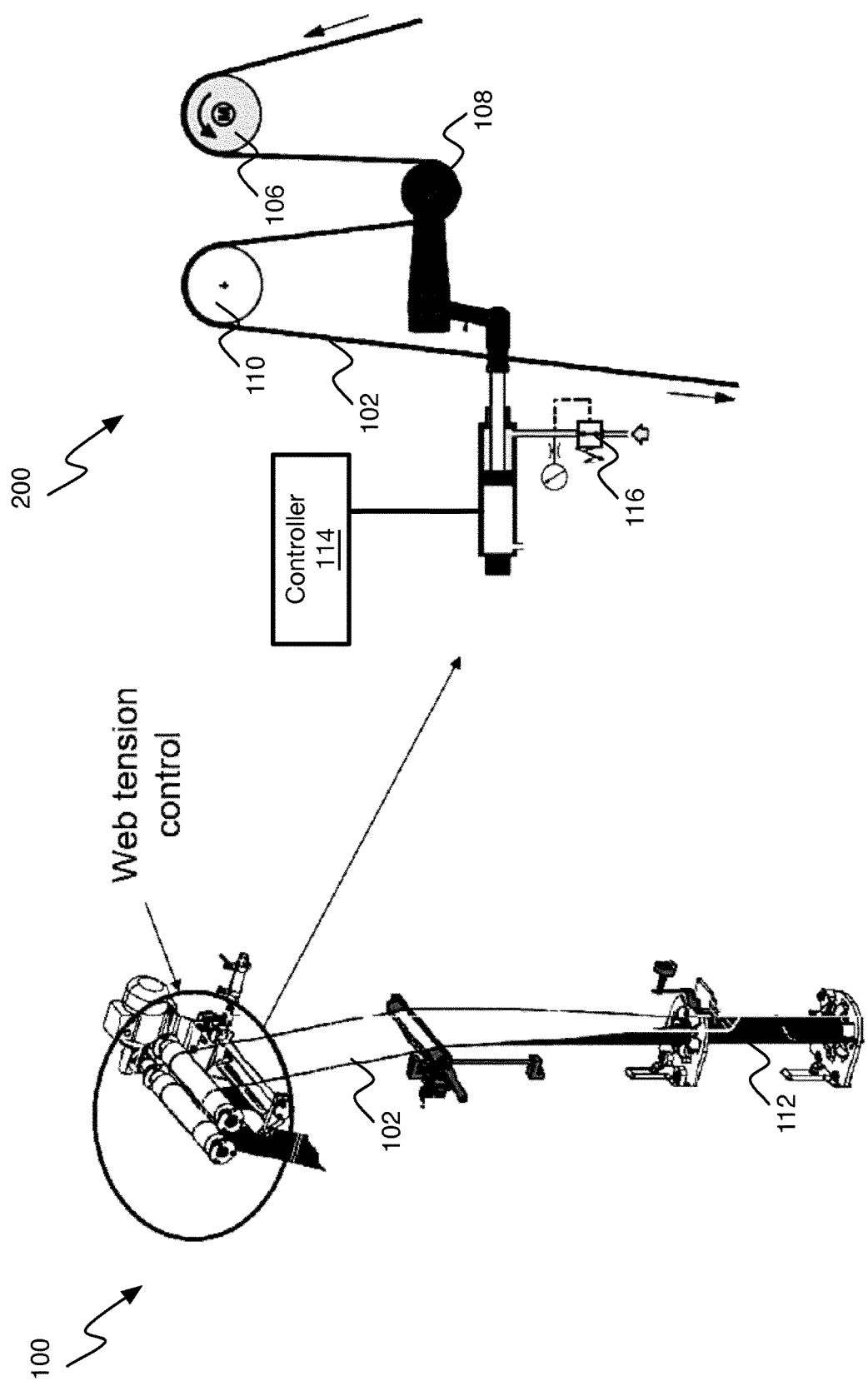
FIG. 1 is a schematic diagram of a portion of a food packaging machine, in accordance with one embodiment.

As was mentioned above, a goal with the various embodiments of the invention is to provide improved control techniques for equipment and systems relating to food processing and packaging, and in particular with respect to web tensioning. Having a proper web tension is important, not only from machine packaging machine operation point of view, but also from a functionality point of view, as an improper web tension might result in integrity issues of the packages formed by the packaging machine. By applying the general concepts of reinforcement learning and/or deep reinforcement learning techniques to control a web tensioning system of the food packaging machine, a larger range of factors can be taken into account compared to what is possible in existing systems and the web tensioning can be adjusted very precisely, such that the operation of the food packaging machine can be enhanced, and the package integrity, formation and appearance can be ensured.

Both reinforcement learning and deep reinforcement learning are examples of machine learning techniques. In general, reinforcement learning (RL) can be characterized as dynamically learning through the use of positive or negative rewards. A system performance is evaluated with respect to a desired target. If the target is reached or not, a positive reward is delivered, and if the target is not reached, a negative reward is delivered. As the positive and negative rewards accumulate over time, the RL model evolves a control policy for the system, with the goal of maximizing the outcome. Deep reinforcement learning (DRL) can be characterized as an enhancement of RL, in which RL is used together with a neural network when evolving the control policy for the system.

In the context of food processing and packaging, RL (i.e., agent-environment interaction) can be used to evolve a control policy for a food processing and/or packaging machine. Using DRL (i.e., RL together with a neural network) can be particularly useful when evolving control policies for sub-systems, such as the filling sub-system, that must consider a large number of variables whose internal relations and effects on the sub-system may not be known. In addition, it should be noted that RL and DRL techniques can also be used to improve existing, local control techniques, in essence by "filling in the gaps" of conventional control techniques with this data-driven approach. Thus, the DRL algorithm can then directly (or indirectly through other control layers, e.g., by tuning of the gains of a conventional PID controller to allow the PID controller to operate more efficiently compared to the conventional control techniques) control the actuators (e.g., servomotors, pneumatic actuators or other actuators) that adjust the web tensioning in food packaging systems that may occur in a food packaging system.

In order to further illustrate these principles, various embodiments of the invention will now be described more fully by way of example of controlling a web tensioning sub-system in a food packaging machine to ensure proper web tensioning throughout the food packaging machine, and with reference to the accompanying drawings in which some, but not all, embodiments of the invention are shown. The invention may be embodied in many different forms and should not be construed as limited to the embodiments set forth herein.

As was mentioned above, a web tensioning sub-system is an important part of a food packaging machine, and its operation needs to be carefully controlled in order to ensure that the web moves smoothly and at a desired speed throughout the food packaging machine, despite the intermittent operation of the jaw system described above, so as to be able to ensure proper package integrity, formation, and appearance.

FIG. 1 shows a schematic view of a sub-section of a food packaging machine 100, where a web 102 of packaging material, which preferably includes at least one sealable surface thereon, is fed forwardly through a web feeder over guide rolls 106, 108, 110 in an S-shaped pattern and formed into a tube 112. The longitudinally overlaid side edges of the web 102 are sealed to close the tube along the longitudinal edge. The side edges may be overlaid either with the undersides against each other or overlapped with the undersides facing in the same direction. A strip of tape may also be provided along one or both of the longitudinal edges to assist in tube formation.

After forming the tube from the web, a food product is fed into the formed tube at a filling station (not shown). Food product in this context refers to anything that people or animals ingest, eat and/or drink or that plants absorb, including but not limited to liquid, semi-liquid, viscous, dry, powder and solid food products, drink products, and water. For the avoidance of doubt, food products also include ingredients for preparing food. Some examples of food products include milk, water and juice. The filled tube is then forwarded to a jaw system, which creates transverse seals of the filled tube and severs the sealed tube transversely of its length and within the bounds of the transversely sealed areas to form individual packages filled with the product. Thus, the jaw system creates a pulling force on the web 102 in a forward direction. As was mentioned above, a corresponding, opposite force is created on the web 102 as a result of the inertia from the large rolls holding the web 102 at the beginning of the packaging machine.

The right side of FIG. 1 shows a more detailed view of a web tensioning sub-system 200 of the food packaging machine 100. In the illustrated embodiment of the web tensioning sub-system 200, in order to regulate the tension on the web 102, the middle guide roll 108 is movable in a vertical direction, thus allowing the tension on the web 102 to be reduced during those times when the jaw system actively pulls the web 102 in a forward direction, and to be increased during those times when the jaw system does not actively pull on the web 102. It should be noted that FIG. 1 only shows one possible embodiment of a web tensioning sub-system 200, and that other embodiments may have a larger number of guide rolls in which several guide rolls may move. Likewise, the reference to a vertical motion of the middle guide roll 108 is merely done for purposes of explanation. In other embodiments, the guide rolls may be rotated, say, 90 degrees compared to what is illustrated in FIG. 1, such that the movement of the middle guide roll 108 instead is a movement in a left-right direction. Thus, many variations can be envisioned by those having ordinary skill in the art. Due to its movement, the middle guide roll 108 is also often referred to as a pendulum roll.

In the embodiment shown in FIG. 1, the movement of the middle guide roll 108 is performed in response to signals from a controller 114. The controller 114 receives input from a sensor 116 in the web tensioning sub-system 200 that measures the current tension of the web.

In addition, the controller also receives input from one or more remote, sub-systems of the food packaging machine 100, and from one or more remote sub-systems of the food packaging machine 100, which may experience events that also influence the operation of the web tensioning sub-system 200. Some examples of such events may include splice events (i.e., when a tail end of packaging web on a used roll of packaging web, at the beginning of the food packaging machine, is joined with a front end of packaging web of a fresh roll of packaging web to create a continuous packaging web, thus creating a section of web having a thickness of two layers instead of a single layer); acceleration, deceleration or stops of the web 102 due to jaw movement or for other reasons; packaging material change; product change; package filling status; web length, etc.

Figure 2:
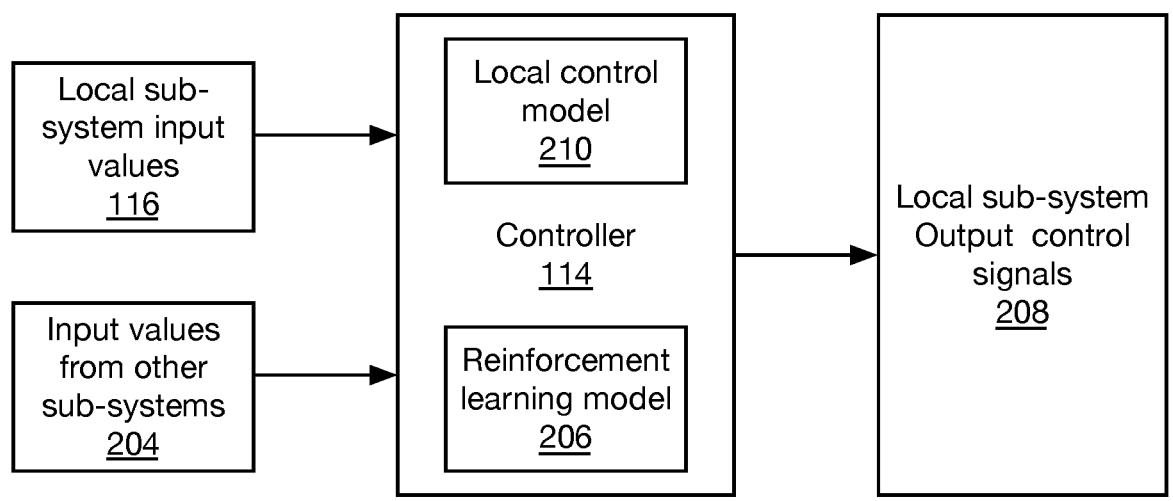
FIG. 2 is a schematic diagram of a controller in a food packaging machine, in accordance with one embodiment

These events can be represented by a set of variables, whose values indicate various states at different sub-systems of the food packaging machine. This is schematically illustrated in FIG. 2, which shows how the input from the local sensor 116 of the web tensioning sub-system 200 is input to the controller 114 along with the input values 204 from other sub-systems of the food packaging machine.

In one embodiment, some examples of variables representing physical parameters from the local web tensioning sub-system 200 include:

A web tension set point (i.e., a desired web tension for the particular type of web being used in the food packaging machine).

A web current web tensioning system position (e.g., as represented by the physical displacement of the movable guide roller from its neutral position).

In one embodiment, some examples of variables from other sub-systems include:

Web movement and control variables representing (e.g., detection of splices or size of packages, speed, etc.)

Jaw system motion profile (e.g., how often and with how much force the jaws pull on the web, etc.)

Packaging material characteristics variables (e.g., packaging material stiffness, presence of closures, package volume, web length, etc.)

Filling status (e.g., filling flow, product level, etc.)

As can be realized, these are merely a few examples of possible influencing factors from other sub-systems, and should not be considered as an exhaustive list. However, they do represent influencing factors which cannot be considered by conventional web tensioning control systems, as it is difficult or impossible to determine how various possible combination of these factors should influence the operation of the web tensioning sub-system 200.

In accordance with the various embodiments described herein, the controller 114 uses a local control model 210 to process the local sub-system input variables 116, in combination with a reinforcement learning model 206 to process the input values from the other sub-systems, to determine how all the measured variables as a whole collectively influence the operation of the web tensioning sub-system 200. The local control model 206 can be an algorithm executed by PID controller. The reinforcement learning model 206 can be a deep reinforcement learning model, which includes one or more neural networks, as described above. In some embodiments, the local sub-system input variables 116 can be processed by the reinforcement learning model 206. In some embodiments, the reinforcement learning model 206 can be used to figure out how different combinations of local and remote variables should influence the web tensioning sub-system and use this insight to improve the local control model 210. Based on the result of this processing and determination, the controller 114 generates a set of output control signals 208 for the local web tensioning sub-system 200, which control the position of the middle guide roll 108 to accomplish the proper web tension.

Examples of neural networks that can be used in embodiments that use a deep reinforcement learning model 206 include, for example, a Convolution Neural Network (CNN) that has been trained using reinforcement learning and deep reinforcement learning, a Recurrent Neural Network (RNN), such as a Long Short-Term Memory (LSTM) neural network, which is often used in the field of deep learning, or a fully connected neural network. The LSTM network may be particularly useful since, unlike standard feedforward neural networks, the LSTM has feedback connections. This enables the LSTM to process not only single data points, but also entire sequences of data, which can be particularly useful in the context of a food packaging machine designed to generate a large number of packages.

Thus, if the tension of the web 102 varies, for example, due to the changing nature of the jaw movement, or due to imprecise functioning of one or more mechanical elements of the filling machine, the data driven approach allows the controller 114 to detect such variance in web tension and adjust the position of the middle guide roll 108 to ensure proper web tension all the time, thereby avoiding potential damage to the packaging material and ensuring sealing and forming quality. Moreover, conventional control techniques often require a manual calibration for each different working setup. In contrast, this embodiment of the invention allows for a training environment to be provided, which enables the controller 114 to learn the optimal control policy given the goal for the web tensioning sub-system 200. This may save a considerable number of manhours in setting up the packaging machine, and thereby also reduce the time to market of new packages and products. Furthermore, in some embodiments, the output from the reinforcement learning model can be used to tune the gains of a conventional PID controller, such that the PID controller can operate more efficiently compared to the conventional control techniques where the PID controller relies on local variable values only. Thus, embodiments of the invention can be beneficial even in situations where the only means for controlling the web tensioning sub-system 200 is a PID controller.

It should be noted that even though a sub-system has been referred to above as a web tensioning system, filling system, a sterilizing system, a package folding system, etc. it can also refer to a portion of the above-mentioned sub-system, or individual elements.

It should be noted that in some embodiments, the control models for the controller 140 can reside within the controller 140 itself, as illustrated in FIG. 1. In other embodiments, they may reside in and operate from external hardware/software (e.g., an external computer or similar processing equipment) to further accelerate the required computations and the controller 140 in the food packaging machine may be a simpler controller that merely executes the functionality, as determined by the external hardware/software.

The systems and methods disclosed herein can be implemented as software, firmware, hardware or a combination thereof. In a hardware implementation, the division of tasks between functional units or components referred to in the above description does not necessarily correspond to the division into physical units; on the contrary, one physical component can perform multiple functionalities, and one task may be carried out by several physical components in collaboration.

Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, optical or magnetic storage devices, or any other medium which can be used to store the desired information and which can be accessed by a computer.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the description above follows that, although various embodiments of the invention have been described and shown, the invention is not restricted thereto, but may also be embodied in other ways within the scope of the subject-matter defined in the following claims.

The invention claimed is:

1. A method for controlling web tensioning in a food packaging machine, the method comprising:
   receiving one or more local variable values indicating measurements by the food packaging machine of one or more physical parameters for a web tensioning sub-system of a plurality of local sub-systems, wherein the one or more local variable values include measurements relating to one or more of: a web tension set point or a current web tensioning system position;
   receiving one or more remote variable values indicating measurements by the food packaging machine of one or more physical parameters for one or more remote sub-systems, wherein the one or more remote variable values include measurements relating to one or more of: web movement control variables, a jaw motion profile, packaging material characteristics, or a filling status;
   determining one or more control parameter values for the web tensioning sub-system, by processing the remote variable values and the local variable values using a reinforcement learning model and a local control model; and
   adjusting the one or more control parameters of the web tensioning sub-system in accordance with the determined control parameter values.

2. The method according to claim 1, wherein the reinforcement learning model comprises a deep reinforcement learning model including a neural network.

3. The method according to claim 2, wherein the neural network comprises one of: a convolution neural network, a recurrent neural network, a Long Short-Term Memory neural network, or a fully connected neural network.

4. The method according to claim 1, wherein the web tensioning sub-system includes two stationary guide rolls and a movable guide roll.

5. The method according to claim 4, wherein the movable guide roll is located between the two stationary guide rolls along a path traversed by the web through the packaging machine, and is movable so as to increase or decrease the tension of the web in response to instructions received from the control parameter values.

6. A non-transitory computer readable storage medium storing instructions that, when executed by a processor, cause the processor to carry out the method according to claim 1.

7. A food packaging machine comprising:
   a plurality of local sub-systems configured to control web tensioning;
   a memory; and
   a processor,
   wherein the memory stores instructions that, when executed by the processor, cause the processor to perform a method comprising:
      receiving one or more local variable values indicating measurements by the food packaging machine of one or more physical parameters for a web tensioning sub-system of the plurality of local sub-systems, wherein the one or more local variable values include measurements relating to one or more of: a web tension set point or a current web tensioning system position;
      receiving one or more remote variable values indicating measurements by the food packaging machine of one or more physical parameters for one or remote sub-systems, wherein the one or more remote variable values include measurements relating to one or more of: web movement control variables, a jaw motion profile, packaging material characteristics, or a filling status;
      determining one or more control parameter values for the web tensioning sub-system, by processing the remote variable values and the local variable values using a reinforcement learning model and a local control model; and
      adjusting one or more control parameters of the web tensioning sub-system in accordance with the determined control parameter values.

8. The food packaging machine according to claim 7, wherein the reinforcement learning model comprises a deep reinforcement learning model including a neural network.

9. The food packaging machine according to claim 8, wherein the neural network comprises one of: a convolution neural network, a recurrent neural network, a Long Short-Term Memory neural network, or a fully connected neural network.

10. The food packaging machine according to claim 7, wherein the web tensioning sub-system includes two stationary guide rolls and a movable guide roll.

11. The food packaging machine according to claim 10, wherein the movable guide roll is located between the two stationary guide rolls along a path traversed by the web through the packaging machine, and is movable so as to increase or decrease the tension of the web in response to instructions from the received control parameter values.

* * * * *